United States Patent
Topchy et al.

(10) Patent No.: US 12,386,888 B2
(45) Date of Patent: Aug. 12, 2025

(54) COMPENSATING FOR TIME SCALE DIFFERENCES BETWEEN AUDIO AND OTHER SIGNALS IN FINGERPRINTING AND MATCHING APPLICATIONS

(71) Applicant: The Nielsen Company (US), LLC, New York, NY (US)

(72) Inventors: Alexander Topchy, Oldsmar, FL (US); Christen V. Nielsen, Dunedin, FL (US); Jeremey M. Davis, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 338 days.

(21) Appl. No.: 18/306,182

(22) Filed: Apr. 24, 2023

(65) Prior Publication Data
US 2024/0354338 A1  Oct. 24, 2024

(51) Int. Cl.
*G06F 16/683* (2019.01)
*G06F 16/63* (2019.01)

(52) U.S. Cl.
CPC ............ *G06F 16/683* (2019.01); *G06F 16/63* (2019.01)

(58) Field of Classification Search
None
See application file for complete search history.

(56) References Cited

U.S. PATENT DOCUMENTS

| | | | |
|---|---|---|---|
| 2007/0168409 A1* | 7/2007 | Cheung | G06F 16/435 708/400 |
| 2010/0280641 A1* | 11/2010 | Harkness | H04N 21/4394 700/94 |
| 2016/0247512 A1* | 8/2016 | Duong | G06F 17/141 |
| 2022/0284917 A1* | 9/2022 | Topchy | G10L 25/51 |

\* cited by examiner

*Primary Examiner* — Walter F Briney, III
(74) *Attorney, Agent, or Firm* — McDonnell Boehnen Hulbert & Berghoff LLP

(57) ABSTRACT

A method includes receiving, by a computing system, an audio signal, where the audio signal defines a segment of media content over time. The method also includes establishing by the computing system, based on the received audio signal, a normalized query frequency-domain representation of the received audio signal. The method further includes matching, by the computing system, the normalized query frequency-domain representation of the received audio signal with a correspondingly normalized reference frequency-domain representation of a reference audio signal having an associated identity. The method additionally includes based on the matching, determining by the computing system that an identity of the received audio signal is the associated identity of the reference audio signal.

20 Claims, 6 Drawing Sheets

COMPENSATING FOR TIME SCALE DIFFERENCES BETWEEN AUDIO AND OTHER SIGNALS IN FINGERPRINTING AND MATCHING APPLICATIONS

USAGE AND TERMINOLOGY

In this disclosure, unless otherwise specified and/or unless the particular context clearly dictates otherwise, the terms "a" or "an" mean at least one, and the term "the" means at least one.

In this disclosure, the term "computing system" means a system that includes at least one computing device. In some instances, a computing system can include one or more other computing systems.

BACKGROUND

In various scenarios, a content distribution system can transmit content to one or more content-presentation devices, which can receive and output the content for presentation to an end-user. Further, such a content distribution system can transmit content in various ways and in various forms. For instance, a content distribution system can transmit content in the form of an analog or digital broadcast stream representing the content.

SUMMARY

In one aspect, a method includes receiving, by a computing system, an audio signal, where the audio signal defines a segment of media content over time. The method also includes establishing by the computing system, based on the received audio signal, a normalized query frequency-domain representation of the received audio signal. Establishing the normalized query frequency-domain representation of the received audio signal includes (i) establishing, by the computing system, a query frequency-domain representation of the received audio signal over a sequence of frequencies, (ii) determining, by the computing system, a frequency peak of the established query frequency-domain representation within a predefined frequency bin within the sequence of frequencies, and (iii) transforming the query frequency-domain representation of the audio signal to move the determined frequency peak to a predefined relative position in the predefined frequency bin, where transforming the predefined frequency-domain representation produces the normalized query frequency-domain representation of the received audio signal. The method additionally includes matching, by the computing system, the normalized query frequency-domain representation of the received audio signal with a correspondingly normalized reference frequency-domain representation of a reference audio signal having an associated identity. The method further includes, based on the matching, determining by the computing system that an identity of the received audio signal is the associated identity of the reference audio signal.

In another aspect, a non-transitory computer-readable storage medium has stored thereon program instructions that, upon execution by a processor, cause performance of a set of operations. The set of operations includes receiving, by a computing system, an audio signal, where the audio signal defines a segment of media content over time. The set of operations also includes establishing by the computing system, based on the received audio signal, a normalized query frequency-domain representation of the received audio signal. Establishing the normalized query frequency-domain representation of the received audio signal includes (i) establishing, by the computing system, a query frequency-domain representation of the received audio signal over a sequence of frequencies, (ii) determining, by the computing system, a frequency peak of the established query frequency-domain representation within a predefined frequency bin within the sequence of frequencies, and (iii) transforming the query frequency-domain representation of the audio signal to move the determined frequency peak to a predefined relative position in the predefined frequency bin, where transforming the predefined frequency-domain representation produces the normalized query frequency-domain representation of the received audio signal. The set of operations further includes matching, by the computing system, the normalized query frequency-domain representation of the received audio signal with a correspondingly normalized reference frequency-domain representation of a reference audio signal having an associated identity. The set of operations additionally includes, based on the matching, determining by the computing system that an identity of the received audio signal is the associated identity of the reference audio signal.

In a further aspect, a computing system includes a processor and a non-transitory computer-readable storage medium, having stored thereon program instructions that, upon execution by the processor, cause performance of a set of operations. The set of operations includes receiving, by the computing system, an audio signal, where the audio signal defines a segment of media content over time. The set of operations further include establishing by the computing system, based on the received audio signal, a normalized query frequency-domain representation of the received audio signal. Establishing the normalized query frequency-domain representation of the received audio signal includes (i) establishing, by the computing system, a query frequency-domain representation of the received audio signal over a sequence of frequencies, (ii) determining, by the computing system, a frequency peak of the established query frequency-domain representation within a predefined frequency bin within the sequence of frequencies, and (iii) transforming the query frequency-domain representation of the audio signal to move the determined frequency peak to a predefined relative position in the predefined frequency bin, where transforming the predefined frequency-domain representation produces the normalized query frequency-domain representation of the received audio signal. The set of operations also includes matching, by the computing system, the normalized query frequency-domain representation of the received audio signal with a correspondingly normalized reference frequency-domain representation of a reference audio signal having an associated identity. The set of operations further includes, based on the matching, determining by the computing system that an identity of the received audio signal is the associated identity of the reference audio signal.

DETAILED DESCRIPTION

I. Overview

Figure 1:
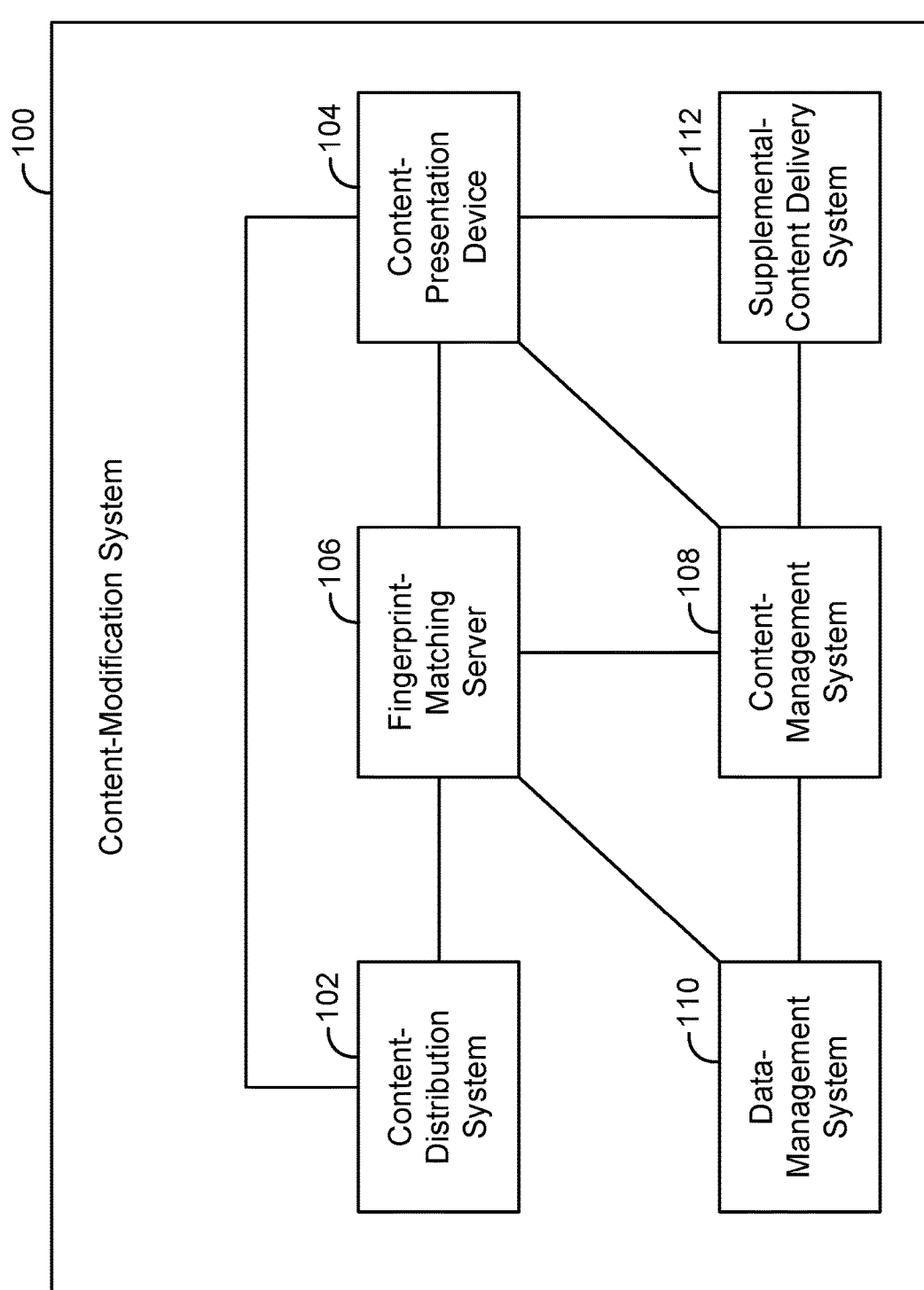
FIG. 1 is a simplified block diagram of an example content-modification system in which various described principles can be implemented.

In a representative media content identification process, a media presentation device may output an audio signal, and a computing system may record or otherwise receive the audio output of the media presentation device. To facilitate identifying the audio output of the media presentation device, the computing system may calculate a frequency-domain representation of the received audio signal, as a query frequency-domain representation. The computing system may then compare the query frequency-domain representation with various reference frequency-domain representations, i.e., the frequency-domain representations of various reference audio signals for which the identities are known, in an effort to find a match and identify the audio signal. This process of matching the query frequency-domain representation of the received audio signal with the reference frequency-domain representations may depend on the media presentation device reliably outputting the audio signal and the computing system reliably obtaining the audio signal output by the media presentation device.

Unfortunately, however, there may be situations where the audio signal received by the computing system has skewed speed and a correspondingly skewed frequency-domain representation. This could happen, for instance, if a user of the media presentation device intentionally alters the audio playback speed, if the media presentation device, computing system, or one or more associated entities err in processing of the audio signal, and/or due to Doppler shifts if the relative positions of the media presentation device and computing system change during the process. Although a user may not notice such a slight audio-speed adjustment, the change in speed may change the frequency-domain representation of the audio signal enough that that frequency-domain representation would fail to match a reference frequency-domain representation of the audio signal—thus preventing or otherwise adversely impacting the audio identification process.

Disclosed herein are methods to help address this issue. In accordance with the disclosure, the computing system may apply a process to normalize the query frequency-domain representation and may then compare that normalized frequency-domain representation with similarly normalized reference frequency-domain representations. A representative normalizing process as to both the query frequency-domain representation and each reference frequency-domain representation could involve evaluating a predefined frequency bin (i.e., a predefined frequency range), finding the peak frequency of the audio signal in that bin, and transforming all of the audio signal linearly such that that the identified peak is centered in the bin. The net result of this normalization process could thus be to align the query frequency-domain representation with the reference frequency-domain representation that should match, thereby facilitating audio identification. In some instances, the process of normalizing and transforming the frequency-domain representation may be equivalent to proportionally and linearly shifting the frequency-domain representation. However, the normalizing transformation of the frequency spectrum may also be some non-linear transformation that depends on the nature of the original process (if known) that caused the time-scaling of the audio signal.

In an example implementation, the computing system may determine the query frequency-domain representation of the received audio signal by calculating a Fourier transform of the audio signal. The query frequency-domain representation of the audio signal may establish frequency peaks at particular frequencies, corresponding with the audio signal including those frequency components.

The computing system may then normalize the query frequency-domain representation by determining the location of a frequency peak within the predefined frequency bin and transforming the location of the peak to be in the center of the predefined frequency bin. For example, the predefined frequency bin could be a frequency range of 1855 Hz to 1933 Hz. The computing system may determine a peak of the query frequency-domain representation in this predefined frequency bin, perhaps a peak with the greatest magnitude. The computing system may then determine how far in the frequency domain that peak would need to be transformed in order to move the peak to the center of the predefined frequency bin, and then the computing system may transform the entire query frequency-domain representation by that distance in the frequency domain. For instance, if the greatest-magnitude peak in the example predefined frequency bin of the query frequency-domain representation is at 1870 Hz, the computing system may determine that that peak would need to be transformed by +24 Hz in order to put it at the center of the predefined frequency bin. Therefore, the computing system may transform the full query frequency-domain representation by +24 Hz.

In other implementations, the normalizing process may be based on a predefined frequency feature other than the greatest peak in the predefined frequency bin. Also, the normalizing process may work to transform the frequency-domain representation such that the predefined frequency feature would be moved to a predefined position in the frequency bin other than the center of the frequency bin.

If the query frequency-domain representation and each of the reference frequency-domain representations are normalized in the same manner as each other (e.g., with respect to the same position in the same frequency bin), then the process of matching and audio-identification may overcome the issue noted above. Namely, although the frequency domain of a given such audio signal may be slightly skewed, having all of the frequency-domain representations be normalized in the same manner as each other may allow the query frequency-domain representation to match the reference frequency-domain representation of the same audio.

In an example implementation, the computing system itself may normalize both the query frequency-domain representation and the various reference frequency-domain representations, to facilitate this matching and audio-identification process. Additionally and/or alternatively, the computing system may be pre-provisioned with the normalized versions of the reference frequency-domain representations, and the computing system may correspondingly normalize the query frequency-domain representation to facilitate the matching and audio-identification process. Further additionally and/or alternatively, the computing system may normalize the query frequency-domain representation and the computing system may then send the normalized query frequency-domain representation to another computing system that stores reference audio signals or representations of the reference audio signals such that the other computing system may determine a matching normalized reference frequency-domain representation.

Optimally, this process might avoid the need for the computing system to determine whether the audio signal received from the media presentation device is time scaled or otherwise frequency skewed and to otherwise address that issue. Further, the process could facilitate robust application to various different received audio signals.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. Further, a connection can be a direct connection or an indirect connection, the latter being a connection that passes through and/or traverses one or more entities, such as a router, switcher, or other network device. In addition, a communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
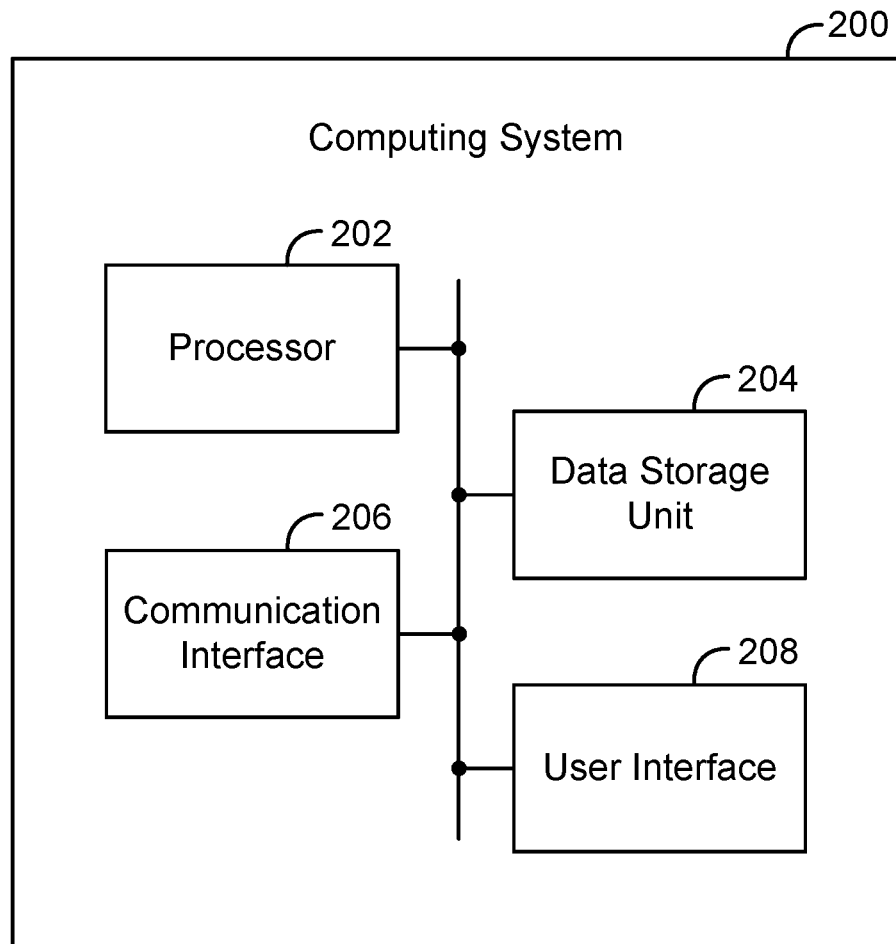
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, data storage 204, a communication interface 206, and/or a user interface 208.

The processor 202 can be or include one or more general-purpose processors (e.g., microprocessors) and/or one or more special-purpose processors (e.g., digital signal processors, application specific integrated circuits, etc.) The processor 202 can execute program instructions included in the data storage 204 as described below.

The data storage 204 can be or include one or more volatile, non-volatile, removable, and/or non-removable storage components, such as magnetic, optical, and/or flash storage, and/or can be integrated in whole or in part with the processor 202. Further, the data storage 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data storage 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include one or more input components such as a keyboard, a mouse, a remote controller, a microphone, and/or a touch-sensitive panel. The user interface 208 can also be or include one or more output components such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, an example of which could be the computing system 200. In some cases, some or all these entities can take the form of a more specific type of computing system. For instance, the content-presentation device 104, may take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, examples of general operations related to the content-distribution system 102 transmitting content and the content-presentation device 104 receiving and outputting content will now be described.

To begin, the content-distribution system 102 can transmit content (e.g., content that the content-distribution system 102 received from a content provider) to one or more entities such as the content-presentation device 104. Content can be or include audio content and/or video content, among other possibilities. In some examples, content can take the form of a linear sequence of content segments (e.g., program segments and/or advertisement segments) or a portion thereof. In the case of video content, a portion of the video content may be one or more video frames and another portion may be one or more audio frames defining an audio track, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user.

B. Operations Related to Identifying Media Content

In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, content that enhances the given advertisement segment in a way that is again perhaps more targeted to the end-user. The described content-modification system 100 can facilitate providing these and other related features.

To facilitate these content-modification operations, a computing system may identify the content presented by the content-presentation device 104, so that the content-presentation device 104 may determine when to perform content-modification operations and which modification(s) to apply. The computing system may be included in the content-presentation device 104 and/or separate from content-presentation device 104, such that the computing system may record or otherwise receive an output of the content-presentation device 104. In some examples, the content-presentation device 104 may output at least an audio signal, and the computing system may record or otherwise receive the outputted audio signal to determine an identity of the content being presented by the content-presentation device 104.

In an example identification process, the computing system may generate a fingerprint of the audio signal. The fingerprint may be a set of data that specifies frequency components of the audio signal over time. The computing system may therefore generate a fingerprint of the audio signal by determining one or more frequencies that are included in the audio signal. Determining one or more frequencies that are included in the audio signal may involve calculating a Fourier transform of the audio signal and/or performing one or more other calculations that result in a determination of one or more frequencies that are included in the audio signal or of a representation of the one or more frequencies.

The fingerprint-matching server 106 may store one or more reference fingerprints, where each reference fingerprint may be associated with an identity or other classification. The computing system may send a query fingerprint, e.g., the audio fingerprint of the audio signal, to the fingerprint-matching server 106 so that the fingerprint-matching server 106 may find a matching reference fingerprint for the query fingerprint and associate the query fingerprint with the identity or classification of the matching reference fingerprint. Finding a matching reference fingerprint may involve finding a reference fingerprint having the one or more frequencies included in the query fingerprint.

C. Operations Related to Compensating for Time Scale Differences

Because finding a matching reference fingerprint may involve finding a reference fingerprint having one or more frequencies included in the query fingerprint, a potential issue may arise where fingerprint-matching server 106 cannot find a matching reference fingerprint due to the computing system receiving the audio signal of the query fingerprint at an accelerated or delayed frequency. The computing system may receive the audio signal of the query fingerprint at an accelerated or delayed frequency when the content-presentation device 104 presents the audio signal at an accelerated or delayed frequency and/or when the computing system records the audio signal at an accelerated or delayed frequency. When the computing system receives an audio signal at an accelerated or delayed frequency and calculates a query fingerprint for the audio signal, the query fingerprint may include one or more different frequencies than the frequencies indicated in the matching reference fingerprint, which may prevent the fingerprint-matching server from matching the query fingerprint with the reference fingerprint.

To help overcome this problem and to facilitate successful matching of a query fingerprint with reference fingerprints, the computing system may normalize the query fingerprint. The query fingerprint may be or may otherwise include a query frequency-domain representation of an audio signal. The computing system may generate a normalized query frequency-domain representation of the audio signal based on the query frequency-domain representation. The computing system may send the normalized query frequency-domain representation of the audio signal as a query fingerprint to the fingerprint-matching server 106. The fingerprint-matching server 106 may calculate or otherwise store normalized reference frequency-domain representations of one or more reference audio signals to determine a matching normalized reference frequency-domain representation for the query fingerprint.

Figure 3:
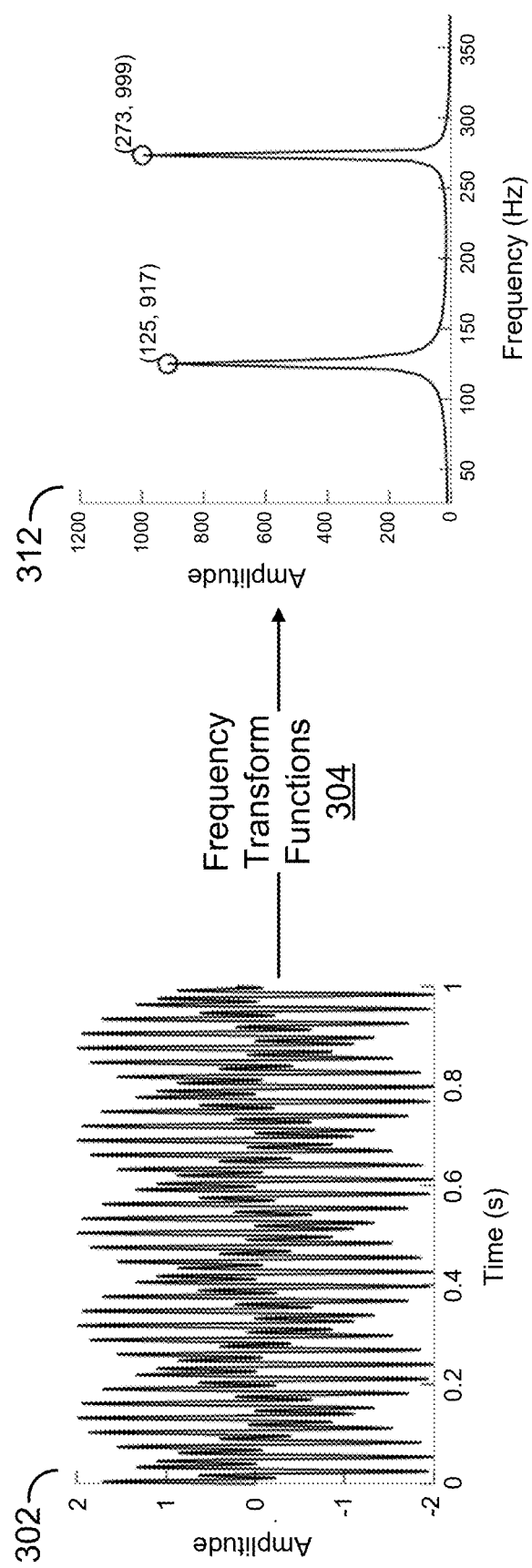
FIG. 3 illustrates generating a query frequency-domain representation from a query audio signal.

As an example, FIG. 3 illustrates generating a query frequency-domain representation 312 of a query audio signal 302. A computing system may receive the query audio signal 302, perhaps by recording the query audio signal 302 from an audio signal being presented by a media presentation device or by otherwise receiving the query audio signal 302. The computing system may generate the query frequency-domain representation 312 from the query audio signal 302 by carrying out one or more frequency transform functions 304.

A frequency-domain representation of an audio signal may indicate one or more frequencies included in the audio signal. For example, as shown in FIG. 3, the query frequency-domain representation 312 may include peaks at 125 Hz and 273 Hz indicating that the audio signal 302 includes at least one signal with a frequency of 125 Hz and at least one signal with a frequency of 273 Hz. Each peak in the query frequency-domain representation 312 may have an associated amplitude, which may indicate the amount of energy or the respective amount of energy in the signal at the respective frequency indicated by the peak. For example, in the query frequency-domain representation 312, the peak at 125 Hz may have an amplitude of 917 and the peak at 273 Hz may have an amplitude of 999, which may indicate that the peak at 125 Hz has less energy than the peak at 273 Hz.

The computing system may generate the query frequency-domain representation 312 using various frequency transform calculations. For example, the computing system may compute a Fourier transform of the query audio signal 302 to obtain the query frequency-domain representation 312. Additionally and/or alternatively, the computing system may compute the discrete cosine transform of the query audio signal 302 to obtain the query frequency-domain representation 312 of the query audio signal 302. Other methods of generating frequency-domain representations are also possible. The computing system may also carry out one or more further functions in addition or as part of the frequency transform functions 304, perhaps to further distinguish frequencies and/or the associated energy of the respective frequency.

Figure 4:
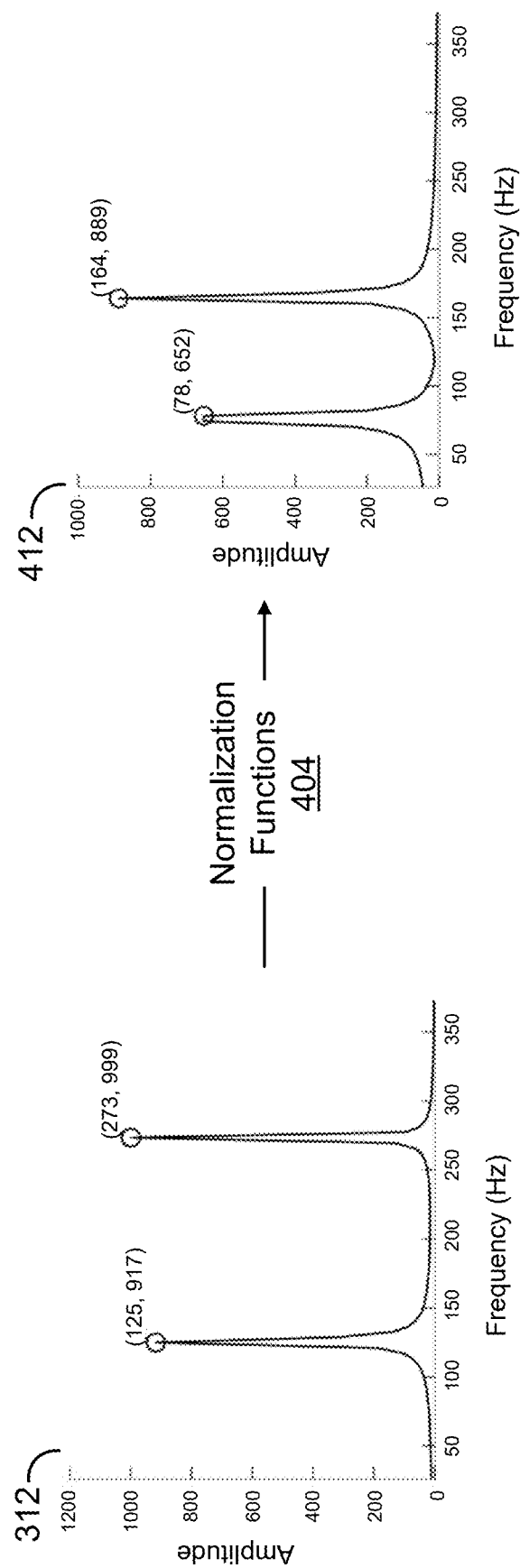
FIG. 4 illustrates generating a normalized query frequency-domain representation from a query frequency-domain representation.

Based on the query frequency-domain representation 312, the computing system may generate a normalized query frequency-domain representation. FIG. 4 illustrates generating a normalized query frequency-domain representation 412 from query frequency-domain representation 312. To generate normalized query frequency-domain representation 412, the computing system may carry out one or more normalization functions 404.

For example, to generate the normalized query frequency-domain representation 412, the computing system may determine the highest peak within a predefined frequency bin in the query frequency-domain representation 312. As an example, the predefined frequency bin may be from 0 Hz to 300 Hz. The computing system may detect the highest peak of the query frequency-domain representation 312 within this predefined frequency bin as the peak at 273 Hz. The computing system may then resample or otherwise transform the associated audio signal (e.g., audio signal 302 of FIG. 3) such that the peak at 273 Hz is shifted to the middle of the predefined frequency range (e.g., such that the peak at 273 Hz is shifted to 150 Hz). To resample the audio signal such that the peak at 273 Hz is shifted to the middle of the predefined frequency range, the computing system may resample at a rate of 150/273 times the original sample rate. The computing system may determine the frequency-domain representation of the resampled audio signal through the frequency transform functions described in the context of FIG. 3 to generate the normalized query frequency-domain representation 412.

Additionally and/or alternatively, to generate the normalized query frequency-domain representation, the computing system may generate the normalized query frequency-domain representation 412 using the query frequency-domain representation without having to perform the frequency transform functions for another time. For example, the computing system may determine the normalized query-frequency domain representation 412 by shifting the query frequency-domain representation 312 such that the highest peak of the query frequency-domain representation is shifted to the middle of the predefined frequency range (e.g., such that the peak at 273 Hz is shifted to 150 Hz). By shifting the query frequency-domain representation 312 without resampling, the computing system may be able to more quickly generate the normalized query frequency-domain representation 312.

The computing system may then send the normalized query frequency-domain representation 412 as a query fingerprint to a fingerprint-matching server or other computing device to determine a matching reference fingerprint. Additionally and/or alternatively, the computing system may send an audio signal or a query frequency-domain representation to the fingerprint-matching server without determining the normalized query frequency-domain representation. If the fingerprint-matching server receives an audio signal, the fingerprint-matching server may carry out the process described above to generate the normalized query frequency-domain representation. If the fingerprint-matching server receives a query frequency-domain representation, the fingerprint-matching server may carry out the normalization functions 404 described above to generate the normalized query frequency-domain representation. In some examples, the fingerprint-matching server or other computing system may store or otherwise generate one or more normalized reference frequency-domain representations.

Figure 5:
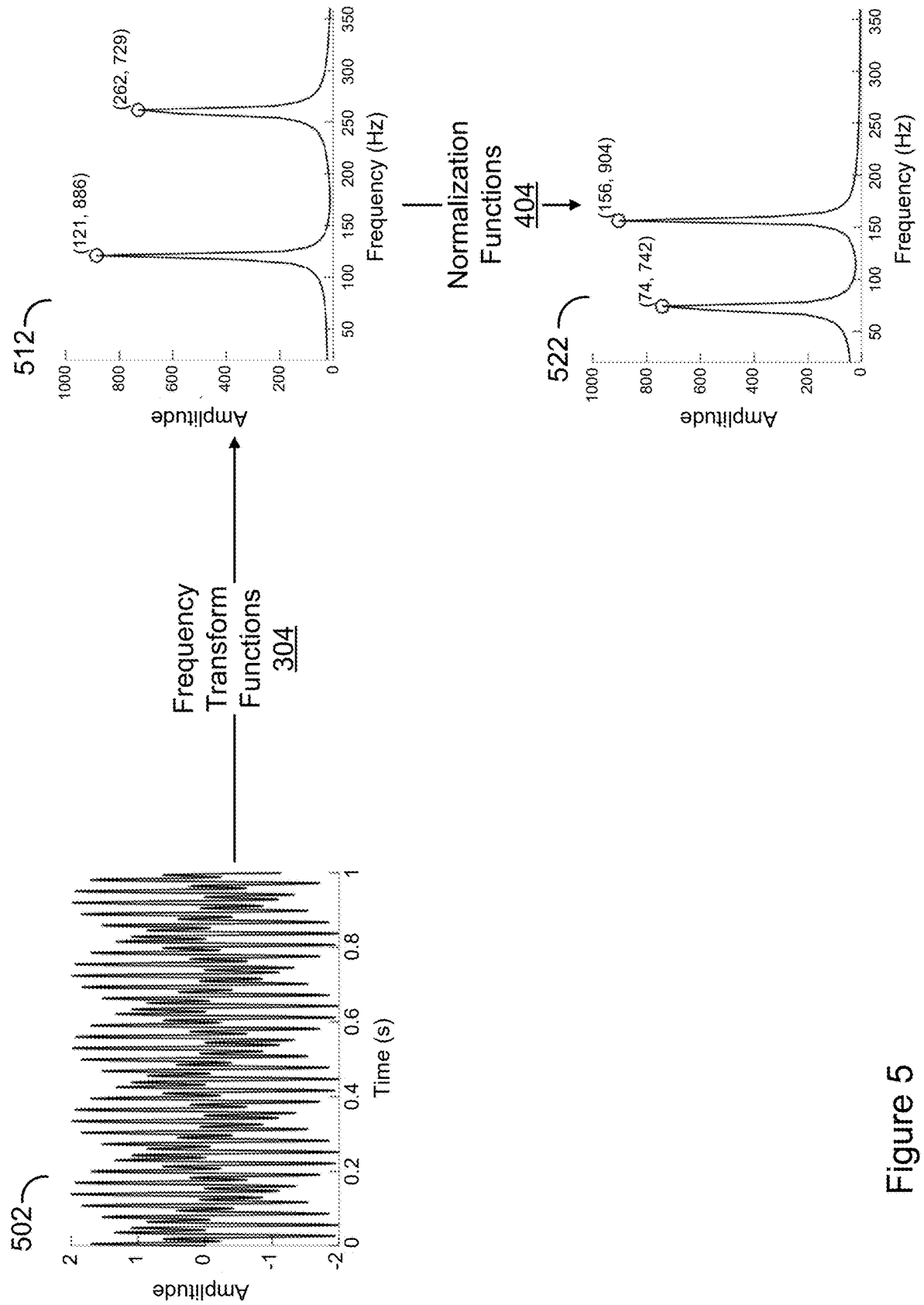
FIG. 5 illustrates generating a normalized reference frequency-domain representation from a reference audio signal.

FIG. 5 illustrates generating a normalized reference frequency-domain representation. The fingerprint-matching server or other computing system may generate reference frequency-domain representation 512 from a reference audio signal 502. In particular, the computing system may generate reference frequency-domain representation 512 from reference audio signal 502 by carrying out the frequency transform functions 304, which may amount to the frequency transform functions 304 of FIG. 3, which may be used to transform the audio signal 302 to frequency-domain representation 312. Based on the generated reference frequency-domain representation 512, the computing system may generate normalized reference frequency-domain representation 522 through carrying out normalization functions 404, which may amount to the normalization functions 404 of FIG. 4 used to transform the frequency-domain representation 312 to normalized-frequency domain representation 412. In some examples, the computing system may use the same predefined frequency bin to generate the normalized reference frequency-domain representation 522 from the reference frequency-domain representation 512 as the normalized query frequency-domain representation 412 of FIG. 4.

For example, as mentioned above, the predefined frequency bin may be from 0 Hz to 300 Hz. Based on the reference frequency-domain representation 512, the computing system detect peaks at peaks at 121 Hz and 262 Hz. The computing system may also detect that the peak at 121 Hz has the highest amplitude of the peaks detected within the predefined frequency bin. The computing system may thus resample the audio signal 502 or otherwise transform the reference frequency-domain representation 512 such that the peak at 121 Hz of the reference frequency-domain representation 512 is shifted to be in the middle of the predefined frequency bin (e.g., at 150 Hz) in the normalized reference frequency-domain representation 522 of the transformed audio signal. Otherwise transforming the reference frequency-domain representation 512 may involve shifting the reference frequency-domain representation 512 such that the largest peak is shifted to be in the middle of the predefined frequency bin.

Based on normalized reference frequency-domain representations, the computing system may match the normalized frequency-domain representation 522 of reference audio signal 502 with the normalized query frequency-domain representation 412 of the query audio signal 302 despite the query audio signal 302 including different frequencies due to being recorded or presented at a different frequency than the reference audio signal 502. In particular, the normalized reference frequency-domain representation 522 may include a peak at 74 Hz with an amplitude of 742 and a peak at 156 Hz with an amplitude of 984. The normalized query frequency-domain representation 412 may include a peak at 78 Hz with an amplitude of 652 and a peak at 168 Hz with an amplitude of 889. Because the peak frequencies and amplitudes of the normalized query frequency-domain representation 412 and the normalized reference frequency-domain representation 522 may be similar, the fingerprint-matching server or other computing system may match the normalized query frequency-domain representation 412 with the normalized reference frequency-domain representation 522.

The reference audio signal 502 or a representation of the reference audio signal 502 (e.g., the normalized reference frequency-domain representation 522) may be associated with an identity of the reference audio signal, perhaps through a mapping associating reference audio signals to various respective identities. The computing system may thereby determine the identity of the audio signal 302 by matching the normalized query frequency-domain representation 412 with the normalized reference frequency-domain representation 522.

Additionally and/or alternatively, a fingerprint-matching server or other computing system may determine the identity of the frequency-domain representations by determining fingerprints based on the resampled audio signals and/or by determining fingerprints based on the normalized frequency-domain representations. In particular, a fingerprint may include one or more normalized frequency-domain representations, each determined using the process described above from a segment of the audio signal. A computing system may determine a query fingerprint using one or more normalized query frequency-domain representations of segments of a query audio signal, and the computing system may send the query fingerprint to the fingerprint-matching server. The fingerprint-matching server or other computing system may determine one or more reference fingerprints using one or more normalized reference frequency-domain representations of segments of one or more reference audio signals. The fingerprint-matching server may then find a match for the query fingerprint among the one or more reference fingerprints.

Because normalized reference frequency-domain representations may be used to match various query audio signals, the fingerprint-matching server or other computing system may store the normalized reference frequency-domain representations of various audio signals in a database on the computing system (e.g., fingerprint-matching server 106). In this manner, the computing system may retrieve the normalized reference frequency-domain representations without having to recalculate normalized reference frequency-domain representations, thereby facilitating a quicker process by which various query audio signals may be analyzed and identified.

Based on the identity of the query audio signal 302, the computing system may carry out various actions. For example, the computing system may determine that the identity of the query audio is associated with an advertisement, and the computing system may send an indication to content-presentation device 104 overlay a targeted advertisement over the content being presented at the content-presentation device. Additionally and/or alternatively, the computing system may determine that the audio signal is indicative of a television show, and the computing system may send an indication to a server device that the user is watching the television show, perhaps to facilitate collecting statistics about which shows the user enjoys and/or about the popularity of the television show. The computing system may also carry out various other actions based on the identity of the query audio signal 302.

In some examples, the methods disclosed herein may be carried out by various computing systems, and/or the computing system carrying out the process may include various computing devices and the methods may occur on various computing devices of the computing system. For example, calculating the frequency-domain representation of the audio signals and/or resampling the audio signal may occur on a different computing system and/or on a different computing device, and the computing systems and/or devices may communicate the audio signals to and from various computing systems and/or devices.

Figure 6:
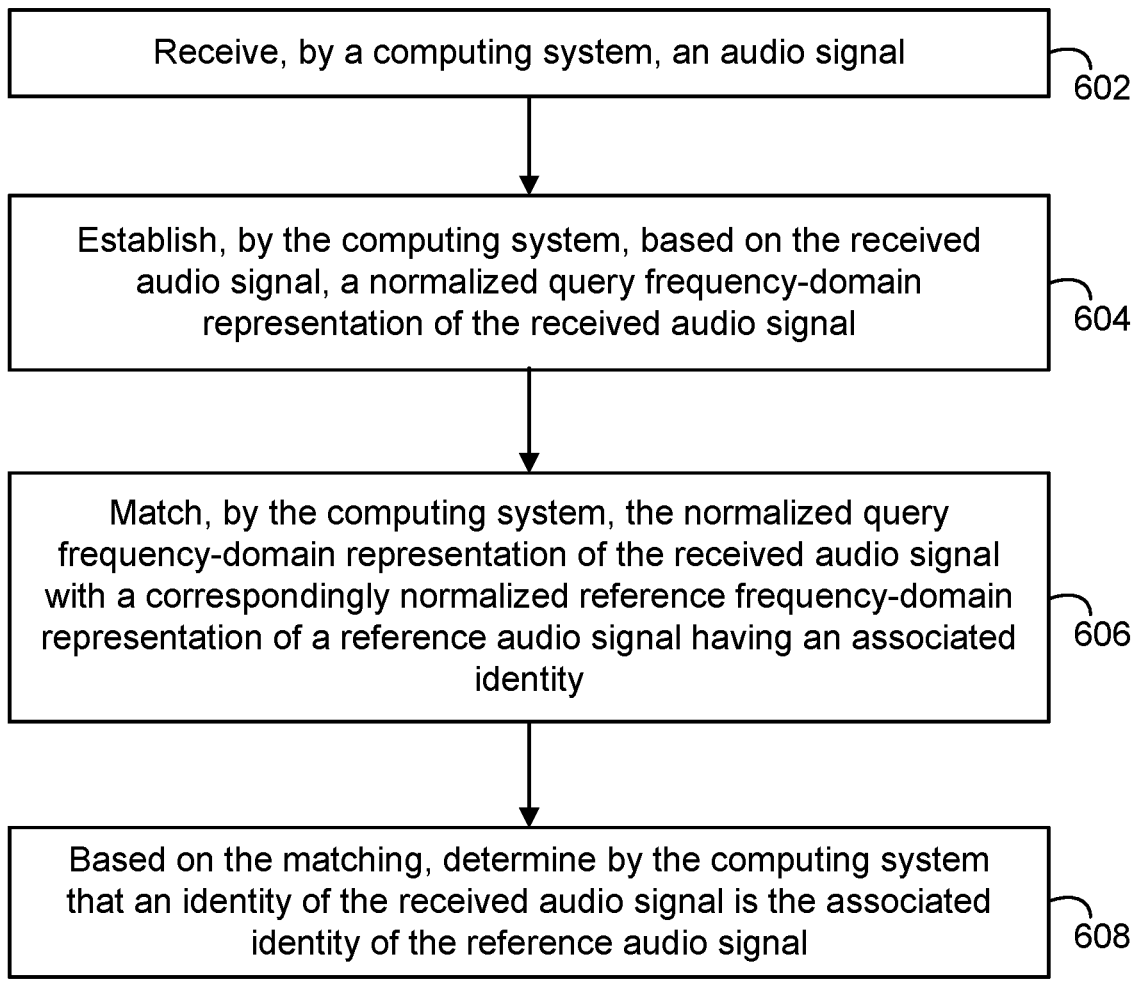
FIG. 6 is a flow chart illustrating an example method.

FIG. 6 is a flow chart illustrating an example method 600 for identifying audio content. As mentioned above, the example method 600 may be carried out by a computing system or various computing devices within a computing system.

At block 602, method 600 includes receiving, by a computing system, an audio signal. The audio signal defines a segment of media content over time.

At block 604, method 600 includes establishing by the computing system, based on the received audio signal, a normalized query frequency-domain representation of the received audio signal. Establishing the normalized query frequency-domain representation of the received audio signal could include establishing, by the computing system, a query frequency-domain representation of the received audio signal over a sequence of frequencies. Establishing the normalized query frequency-domain representation of the received audio signal could also include determining, by the computing system, a frequency peak of the established query frequency-domain representation within a predefined frequency bin within the sequence of frequencies. Establishing the normalized query frequency-domain representation of the received audio signal could further include transforming the query frequency-domain representation of the audio signal to move the determined frequency peak to a predefined relative position in the predefined frequency bin. Transforming the predefined frequency-domain representation produces the normalized query frequency-domain representation of the received audio signal.

At block 606, method 600 includes matching, by the computing system, the normalized query frequency-domain representation of the received audio signal with a correspondingly normalized reference frequency-domain representation of a reference audio signal having an associated identity.

At block 608, method 600 includes based on the matching, determining by the computing system that an identity of the received audio signal is the associated identity of the reference audio signal.

In line with the discussion above, method 600 may further include taking action, by the computing system, based on the determined identity of the received audio signal.

In addition, the act of taking action based on the determined identity of the received audio signal could include establishing, or causing to be established, a record of media consumption of the received audio signal.

Further, the predefined relative position in the predefined frequency bin could be a center of the predefined frequency bin.

In addition, the act of determining the frequency peak within the predefined frequency bin could comprise determining as the frequency peak a frequency peak having a greatest magnitude within the predefined frequency bin.

Still further, the computing system could be pre-provisioned with multiple normalized reference frequency-domain representations, to facilitate the matching.

Yet further, method 600 may further comprise the computing system establishing the correspondingly normalized reference frequency-domain representation.

In addition, the computing system could comprise an audio monitor, where receiving an audio signal comprises receiving, by the audio monitory, the audio signal.

Still further, transforming the query frequency-domain representation of the audio signal to move the determined frequency peak to a predefined relative position in the predefined frequency bin comprises resampling the query frequency-domain representation of the audio signal.

As noted above, this method could be carried out by a computing system such as that described above. Further, the present disclosure also contemplates at least one non-transitory computer readable medium (e.g., magnetic, optical, flash, RAM, ROM, EPROM, EEPROM, etc.) that is encoded with, embodies, or otherwise stores program instructions executable by at least one processor to carry out the operations of the method and/or other operations discussed herein.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations.

Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
   receiving, by a computing system, an audio signal, wherein the audio signal defines a segment of media content over time;
   establishing, by the computing system, based on the received audio signal, a normalized query frequency-domain representation of the received audio signal, wherein establishing the normalized query frequency-domain representation of the received audio signal includes:
   (i) establishing, by the computing system, a query frequency-domain representation of the received audio signal over a sequence of frequencies,
   (ii) determining, by the computing system, a frequency peak of the established query frequency-domain representation within a predefined frequency bin within the sequence of frequencies, and
   (iii) transforming the query frequency-domain representation of the audio signal to move the determined frequency peak to a predefined relative position in the predefined frequency bin, wherein transforming the query frequency-domain representation produces the normalized query frequency-domain representation of the received audio signal;
   matching, by the computing system, the normalized query frequency-domain representation of the received audio signal with a correspondingly normalized reference frequency-domain representation of a reference audio signal having an associated identity; and
   based on the matching, determining by the computing system that an identity of the received audio signal is the associated identity of the reference audio signal.

2. The method of claim 1, further comprising:
   taking action, by the computing system, based on the determined identity of the received audio signal.

3. The method of claim 2, wherein taking action based on the determined identity of the received audio signal comprises establishing, or causing to be established, a record of media consumption of the received audio signal.

4. The method of claim 1, wherein the predefined relative position in the predefined frequency bin is a center of the predefined frequency bin.

5. The method of claim 1, wherein determining the frequency peak within the predefined frequency bin comprises determining as the frequency peak a frequency peak having a greatest magnitude within the predefined frequency bin.

6. The method of claim 1, wherein the computing system is pre-provisioned with multiple normalized reference frequency-domain representations, to facilitate the matching.

7. The method of claim 1, further comprising the computing system establishing the correspondingly normalized reference frequency-domain representation.

8. The method of claim 1, wherein transforming the query frequency-domain representation of the audio signal to move the determined frequency peak to a predefined relative position in the predefined frequency bin comprises resampling the query frequency-domain representation of the audio signal.

9. A computing system comprising:
   a processor; and
   a non-transitory computer-readable storage medium, having stored thereon program instructions that, upon execution by the processor, cause performance of a set of operations comprising:
   receiving an audio signal, wherein the audio signal defines a segment of media content over time;
   establishing based on the received audio signal, a normalized query frequency-domain representation of the received audio signal, wherein establishing the normalized query frequency-domain representation of the received audio signal includes:
   (i) establishing a query frequency-domain representation of the received audio signal over a sequence of frequencies,
   (ii) determining a frequency peak of the established query frequency-domain representation within a predefined frequency bin within the sequence of frequencies, and
   (iii) transforming the query frequency-domain representation of the audio signal to move the determined frequency peak to a predefined relative position in the predefined frequency bin, wherein transforming the query frequency-domain representation produces the normalized query frequency-domain representation of the received audio signal;
   matching the normalized query frequency-domain representation of the received audio signal with a correspondingly normalized reference frequency-domain representation of a reference audio signal having an associated identity; and
   based on the matching, determining that an identity of the received audio signal is the associated identity of the reference audio signal.

10. The computing system of claim 9, further comprising an audio monitor, wherein receiving an audio signal comprises receiving, by the audio monitory, the audio signal.

11. The computing system of claim 9, the operations further comprising:
    taking action based on the determined identity of the received audio signal.

12. The computing system of claim 9, wherein the predefined relative position in the predefined frequency bin is a center of the predefined frequency bin.

13. The computing system of claim 9, wherein determining the frequency peak within the predefined frequency bin comprises determining as the frequency peak a frequency peak having a greatest magnitude within the predefined frequency bin.

14. The computing system of claim 9, wherein the computing system is pre-provisioned with multiple normalized reference frequency-domain representations, to facilitate the matching.

15. The computing system of claim 9, the operations further comprising establishing the correspondingly normalized reference frequency-domain representation.

16. The computing system of claim 9, wherein the computing system comprises an audio monitor for receiving the audio signal and a network server for performing the matching.

17. A non-transitory computer-readable storage medium, having stored thereon program instructions that, upon execution by a processor, cause performance of a set of operations comprising:
- receiving an audio signal, wherein the audio signal defines a segment of media content over time;
- establishing based on the received audio signal, a normalized query frequency-domain representation of the received audio signal, wherein establishing the normalized query frequency-domain representation of the received audio signal includes:
  - (i) establishing a query frequency-domain representation of the received audio signal over a sequence of frequencies,
  - (ii) determining a frequency peak of the established query frequency-domain representation within a predefined frequency bin within the sequence of frequencies, and
  - (iii) transforming the query frequency-domain representation of the audio signal to move the determined frequency peak to a predefined relative position in the predefined frequency bin, wherein transforming the query frequency-domain representation produces the normalized query frequency-domain representation of the received audio signal;
- matching the normalized query frequency-domain representation of the received audio signal with a correspondingly normalized reference frequency-domain representation of a reference audio signal having an associated identity; and
- based on the matching, determining that an identity of the received audio signal is the associated identity of the reference audio signal.

18. The non-transitory computer-readable storage medium of claim 17, the operations further comprising:
- taking action based on the determined identity of the received audio signal.

19. The non-transitory computer-readable storage medium of claim 18, wherein taking action based on the determined identity of the received audio signal comprises establishing, or causing to be established, a record of media consumption of the received audio signal.

20. The non-transitory computer-readable storage medium of claim 17, wherein the predefined relative position in the predefined frequency bin is a center of the predefined frequency bin.

* * * * *